(12) United States Patent
Ishizaka

(10) Patent No.: US 7,165,214 B2
(45) Date of Patent: Jan. 16, 2007

(54) DATA MANAGEMENT SYSTEM, METHOD, AND RECORDING MEDIUM

(75) Inventor: Takashi Ishizaka, Tokyo (JP)

(73) Assignee: Beacon Information Technology Inc., Tokyo (JP)

( * ) Notice: Subject to any disclaimer, the term of this patent is extended or adjusted under 35 U.S.C. 154(b) by 388 days.

(21) Appl. No.: 10/382,764

(22) Filed: Mar. 6, 2003

(65) Prior Publication Data

US 2004/0049730 A1   Mar. 11, 2004

(30) Foreign Application Priority Data

Sep. 5, 2002   (JP) .............................. 2002-259943

(51) Int. Cl.
*G06F 17/00* (2006.01)
*G06F 15/00* (2006.01)

(52) U.S. Cl. ...................................... 715/503; 715/504

(58) Field of Classification Search ................ 715/503, 715/504
See application file for complete search history.

(56) References Cited

U.S. PATENT DOCUMENTS

| | | | | |
|---|---|---|---|---|
| 5,396,621 A * | 3/1995 | MacGregor et al. ........ | 715/809 |
| 5,767,854 A * | 6/1998 | Anwar ........................ | 715/848 |
| 5,784,545 A * | 7/1998 | Anderson et al. ........... | 715/507 |
| 5,819,293 A * | 10/1998 | Comer et al. ................ | 707/203 |
| 5,982,383 A * | 11/1999 | Kumar et al. ................ | 345/440 |
| 6,356,901 B1 * | 3/2002 | MacLeod et al. ............. | 707/6 |
| 6,448,982 B1 * | 9/2002 | Klapper et al. ............. | 715/764 |
| 6,539,403 B1 * | 3/2003 | Cho et al. ................... | 707/203 |
| 2002/0007372 A1 * | 1/2002 | Bauchot et al. ............. | 707/503 |
| 2002/0010743 A1 * | 1/2002 | Ryan et al. .................. | 709/205 |
| 2002/0023106 A1 * | 2/2002 | Bauchot et al. ............. | 707/503 |
| 2002/0065846 A1 * | 5/2002 | Ogawa et al. .............. | 707/503 |
| 2002/0091728 A1 * | 7/2002 | Kjaer et al. .................. | 707/503 |
| 2002/0116417 A1 * | 8/2002 | Weinberg al. ............... | 707/517 |
| 2002/0165875 A1 * | 11/2002 | Verta .......................... | 707/503 |
| 2005/0034060 A1 * | 2/2005 | Kotler et al. ................ | 715/503 |
| 2005/0108623 A1 * | 5/2005 | Bedford et al. ............. | 715/503 |
| 2005/0125377 A1 * | 6/2005 | Kotler et al. ................ | 707/1 |
| 2005/0160379 A1 * | 7/2005 | Roberts ...................... | 715/853 |

OTHER PUBLICATIONS

Rao, Ramana, et al., "The Table Lens: Merging Graphical and Symbolic Representations in a Interactive Focus+Context Visualization for Tabular Information", CHI '94, Boston, MA, © 1994, pp. 318-382 [ACM 0-89791-650-6/94/0318].*

* cited by examiner

*Primary Examiner*—Shahid Alam
*Assistant Examiner*—Robert Stevens
(74) *Attorney, Agent, or Firm*—Dobrusin & Thennisch PC

(57) ABSTRACT

A data management system that facilitates table merges without the necessity of knowledge about a database or creating an environment therefore is provided. With a processor unit, a merging sheet (merged table) for merging a plurality of spreadsheets (tables) is recorded, and then stored in an external storage device. A table designated by the user through mouse operation and the merged table are compared; if cells of the same data exist in a specific column, the data in rows to which said cells in the table belong are merged to rows to which relevant cells of the merged table belong; for rows to which cells existing only in the table belong, they are added as new row data to the merged table. Furthermore, a flag for identifying each table is recorded in rows merged or added to the merged table.

19 Claims, 9 Drawing Sheets

| CUSTOMER CODE | CUSTOMER NAME | ADDRESS |
|---|---|---|
| 00001 | COMPANY A | TOKYO |
| 00002 | COMPANY B | TOKYO |
| 00003 | COMPANY C | TOKYO |
| 00004 | COMPANY D | KANAGAWA |
| 00005 | COMPANY E | KANAGAWA |
| 00006 | COMPANY F | KANAGAWA |
| 00007 | COMPANY G | KANAGAWA |
| 00008 | COMPANY H | CHIBA |

FIG. 8

| CUSTOMER CODE | TELEPHONE NUMBER |
|---|---|
| 00003 | cc — cccc — cccc |
| 00004 | dd — dddd — dddd |
| 00005 | ee — eeee — eeee |
| 00008 | hh — hhhh — hhhh |
| 00009 | xx — xxxx — xxxx |

FIG. 9

| CUSTOMER CODE | eMail — ID |
|---|---|
| 00001 | aaaa @ xxx.co.jp |
| 00002 | bbbb @ yyyy.co.jp |
| 00007 | gggg @ zzz.co.jp |
| 00008 | hhhh @ xyz.co.jp |

FIG. 10

| FLAG 1 | FLAG 2 | FLAG 3 | CUSTOMER CODE | CUSTOMER NAME | ADDRESS |
|---|---|---|---|---|---|
| 1 | | | 00001 | COMPANY A | TOKYO |
| 1 | | | 00002 | COMPANY B | TOKYO |
| 1 | | | 00003 | COMPANY C | TOKYO |
| 1 | | | 00004 | COMPANY D | KANAGAWA |
| 1 | | | 00005 | COMPANY E | KANAGAWA |
| 1 | | | 00006 | COMPANY F | KANAGAWA |
| 1 | | | 00007 | COMPANY G | KANAGAWA |
| 1 | | | 00008 | COMPANY H | CHIBA |

FIG. 11

| FLAG 1 | FLAG 2 | FLAG 3 | CUSTOMER CODE | CUSTOMER NAME | ADDRESS | TELEPHONE NUMBER |
|---|---|---|---|---|---|---|
| 1 | | | 00001 | COMPANY A | TOKYO | |
| 1 | | | 00002 | COMPANY B | TOKYO | |
| 1 | | | 00003 | COMPANY C | TOKYO | |
| 1 | | | 00004 | COMPANY D | KANAGAWA | |
| 1 | | | 00005 | COMPANY E | KANAGAWA | |
| 1 | | | 00006 | COMPANY F | KANAGAWA | |
| 1 | | | 00007 | COMPANY G | KANAGAWA | |
| 1 | | | 00008 | COMPANY H | CHIBA | |

FIG. 12

| FLAG 1 | FLAG 2 | FLAG 3 | CUSTOMER CODE | CUSTOMER NAME | ADDRESS | TELEPHONE NUMBER |
|---|---|---|---|---|---|---|
| 1 | | | 00001 | COMPANY A | TOKYO | |
| 1 | | | 00002 | COMPANY B | TOKYO | |
| 1 | 1 | | 00003 | COMPANY C | TOKYO | cc-cccc-cccc |
| 1 | | | 00004 | COMPANY D | KANAGAWA | |
| 1 | | | 00005 | COMPANY E | KANAGAWA | |
| 1 | | | 00006 | COMPANY F | KANAGAWA | |
| 1 | | | 00007 | COMPANY G | KANAGAWA | |
| 1 | | | 00008 | COMPANY H | CHIBA | |

FIG. 13

| FLAG 1 | FLAG 2 | FLAG 3 | CUSTOMER CODE | CUSTOMER NAME | ADDRESS | TELEPHONE NUMBER |
|---|---|---|---|---|---|---|
| 1 | | | 00001 | COMPANY A | TOKYO | |
| 1 | | | 00002 | COMPANY B | TOKYO | |
| 1 | 1 | | 00003 | COMPANY C | TOKYO | cc – cccc – cccc |
| 1 | 1 | | 00004 | COMPANY D | KANAGAWA | dd – dddd – dddd |
| 1 | 1 | | 00005 | COMPANY E | KANAGAWA | ee – eeee – eeee |
| 1 | | | 00006 | COMPANY F | KANAGAWA | |
| 1 | | | 00007 | COMPANY G | KANAGAWA | |
| 1 | 1 | | 00008 | COMPANY H | CHIBA | hh – hhhh – hhhh |
| | 1 | | 00009 | | | xx-xxxx-xxxx |

FIG. 14

| FLAG 1 | FLAG 2 | FLAG 3 | CUSTOMER CODE | CUSTOMER NAME | ADDRESS | TELEPHONE NUMBER |
|---|---|---|---|---|---|---|
| 1 | 1 | | 00003 | COMPANY C | TOKYO | cc — cccc — cccc |
| 1 | 1 | | 00004 | COMPANY D | KANAGAWA | dd — dddd — dddd |
| 1 | 1 | | 00005 | COMPANY E | KANAGAWA | ee — eeee — eeee |
| 1 | 1 | | 00008 | COMPANY H | CHIBA | hh — hhhh — hhhh |
| 1 | | | 00001 | COMPANY A | TOKYO | |
| 1 | | | 00002 | COMPANY B | TOKYO | |
| 1 | | | 00006 | COMPANY F | KANAGAWA | |
| 1 | | | 00007 | COMPANY G | KANAGAWA | |
| | 1 | | 00009 | | | xx — xxxx — xxxx |

| FLAG 1 | FLAG 2 | NO. OF ROWS | CORRESPONDING TO SET DISPLAY PANE |
|---|---|---|---|
| 1 | 1 | 4 | (I) |
| 1 | 0 | 4 | (II) |
| 0 | 1 | 1 | (III) |

| FLAG 1 | FLAG 2 | FLAG 3 | CUSTOMER CODE | CUSTOMER NAME | ADDRESS | TELEPHONE NUMBER | eMail – ID |
|---|---|---|---|---|---|---|---|
| 1 | 1 | 1 | 00008 | COMPANY H | CHIBA | hh-hhhh-hhhh | hhhh @ xyz.co.jp |
| 1 | 1 |   | 00003 | COMPANY C | TOKYO | cc-cccc-cccc |   |
| 1 | 1 |   | 00004 | COMPANY D | KANAGAWA | dd-dddd-dddd |   |
| 1 | 1 |   | 00005 | COMPANY E | KANAGAWA | ee-eeee-eeee |   |
| 1 |   | 1 | 00001 | COMPANY A | TOKYO |   | aaaa @ xxxx.co.jp |
| 1 |   | 1 | 00002 | COMPANY B | TOKYO |   | bbbb @ yyyy.co.jp |
| 1 |   | 1 | 00007 | COMPANY G | KANAGAWA |   | gggg @ zzz.co.jp |
| 1 |   |   | 00006 | COMPANY F | KANAGAWA |   |   |
|   | 1 |   | 00009 |   |   | xx-xxxx-xxxx |   |

| FLAG 1 | FLAG 2 | FLAG 3 | CUSTOM-ER CODE | CUSTOMER NAME | ADDRESS | TELEPHONE NUMBER | eMail — ID |
|---|---|---|---|---|---|---|---|
| 1 | 1 | 1 | 00008 | COMPANY H | CHIBA | hh-hhhh-hhhh | hhhh@xyz.co.jp |

DATA MANAGEMENT SYSTEM, METHOD, AND RECORDING MEDIUM

CROSS REFERENCE TO RELATED APPLICATION

The present application claims priority from Japanese Application No. 2002-259943 filed Sep. 5, 2002, the disclosure of which is hereby incorporated by reference herein.

FIELD OF THE INVENTION

The present invention relates to a data management system that facilitates merging of spreadsheets having a row/column tabular data structure with rows and columns.

BACKGROUND OF THE INVENTION

Number-crunching computer software ("computer software" is hereinafter referred to simply as "software") that handles spreadsheets having a tabular data structure with rows and columns, such as "Excel" (trademark of Microsoft Corp.), is often used in personal computers (hereinafter referred to simply as "PC").

The objectives of the user to use the spreadsheet software include using the data entered in the spreadsheets as a report and using the spreadsheets as a simplified version of the tables of the database (hereinafter referred to simply as "DB"), in addition to number-crunching. Especially, the spreadsheets, which are similar in data structure to DB tables, are suitable for management of relatively small-sized data. Thus, the spreadsheet software is used more frequently than DB software.

As means to obtain results similar to DB tables by use of the spreadsheet software, sort and filter functions are available. The sort function is to specify a column of a spreadsheet to rearrange data of that column in ascending or descending order, thereby facilitating a search for desired data. The filter function is to specify a column of a spreadsheet to select or delete only specific values of data in that column. By using such functions, a specific group of data in the spreadsheet may be selected or emphasized. Because these functions are similar to specifying the arranging order of output data for the DB table or setting the search criteria, simple selection processing may be readily executed by the spreadsheet software and thus is routinely performed.

In this way, the spreadsheet software may be used in place of the DB software, but it suffers the following problems:

(1) Problem in Unitary Management

As it becomes popular to substitute spreadsheets for DB tables, it is sometimes difficult to manage data when they are scattered all over in multiples.

For example, let us assume that after a list of people to which New Year's cards are to be sent in 2002 is created in a spreadsheet, an address list of New Year's cards for the next year (2003) is created based on that spreadsheet. In one case for creating the address list, the original list is updated/registered as is. In another case, the 2002's list is saved before copying the 2002's list and updating/registering it for the 2003's. In the latter case, if similar lists, such as those for address change notifications, midyear gifts, summer greeting cards, acquaintances' addresses, alumni, and cellphone numbers, as well as New Year's cards, are created based on a single spreadsheet, and they are accumulated, then a problem will occur in their management.

In that case, for personal data, the amount of its data is typically small, so that it is relatively easy to determine which is original data and which is the latest data; however, if such practice is performed in a disorderly fashion by a company having greater numbers of customers, it is quite likely that they become difficult to fathom. To avoid such a situation, unitary management of data in some form is required.

In order to perform unitary management, however, it is necessary to gain knowledge about the DB and learn how to use it, as well as creating an environment where the DB is readily accessible. This imposes a greater burden on the user who wants to implement data management through friendly operations of the spreadsheet software.

(2) Difficulty in Table Merge

With the existing spreadsheet software, it is relatively easy to split a single spreadsheet (table split), extract a portion of data, and perform other simple processing; on the other hand, for merging of multiple spreadsheets (table merge), it cannot be done collectively unless positions of "columns" and arranging orders of "rows" are commonly determined. If the layout of the spreadsheet is determined, a macro function for pre-describing the merge procedure may be used to execute it automatically, although, to write a macro, it is necessary to acquire knowledge about the macro function and program it. However, the number of persons who have learned the macros and are capable of programming them is very limited. In addition, macro programming presumes that the same procedure is repeated; thus, it is not practical to program a macro merely for an operation of makeshift nature.

There is an approach to converting a spreadsheet into a single table of a database before registering it, and defining a relationship between tables registered in the DB, so that multiple tables logically appear as if they were a single table. In that case, too, it is necessary to obtain knowledge about the DB and learn how to use it, as well as creating an environment where the DB is readily accessible, which raises a problem in that a greater burden is imposed on the user.

(3) Difficulty in Data Selection for Composite Criteria

Data selection from a sorted or filtered spreadsheet suffers a significant limitation, as compared to processing on DB tables.

For example, consider a spreadsheet that contains sales records of chain stores. This spreadsheet is assumed to contain data on chain store names, sales amounts, target sales amounts, achievement ratios, expenditures, gross margins, final profits, sales counts of focus product A, and sales counts of focus product B. Based on such a spreadsheet, it is easy to create a list in order of sales amounts, a list in order of achievement ratios, and a list in order of gross margins.

However, as the criteria become more complex, as in a case where chain stores that meet three criteria, i.e., sales amounts of 1 million yen or less, sales target achievement ratios of 60% or less, and gross margins of 0.3 million yen or less, are selected, it is increasingly difficult to do so.

For example, if chain stores that meet all of the three criteria are determined by an "∩" (AND) condition, a list of chain stores that only meet the criterion of sales amounts is first created via the sort and filter functions; the chain stores that meet the criterion of sales target achievement ratios are then narrowed down from the list created; and, finally, the resulting chain stores are further narrowed down by the criterion of gross margins, thereby determining chain stores that meet all of the three criteria.

If chain stores that meet either of the three criteria are determined by an "∪" (OR) condition, lists of stores that meet the respective criteria are first created; however, with such lists, there may be cases where same chain stores overlap; thus, creating lists with such overlaps removed would involve cumbersome procedures.

Furthermore, if three criteria are more complex than simple "∩" or "∪", for example, if you want to determine the most problematic chain store where multiple criteria overlap, and then the next problematic chain store, the resulting difficulty becomes more apparent.

The objective of the present invention is to solve the afore-described problems and to provide a data management system and data management method that enables spreadsheet management through a simple operation.

Another objective of the present invention is to provide a recording medium that allows the computer to execute said data management method.

SUMMARY OF THE INVENTION

A data management system according to the present invention has interface components that enable connections with a display device, an input device, and a data storage device, said data management system comprising: screen display means for displaying a designation screen on said display device, said designation screen allowing the user to designate a spreadsheet having a row/column tabular data structure and a specific column contained in that spreadsheet; designation acceptance means for accepting the spreadsheet and specific column designated by the user through said input device in accordance with said designation screen displayed; merging sheet storing means for generating a merging sheet having a row/column tabular data structure and storing the merging sheet generated into said data storage device; data comparison means for comparing the spreadsheet accepted by said designation acceptance means and the merging sheet stored in said data storage device on a cell-by-cell basis, said cell being an intersection area of the row and column; and sheet merging means for merging, as a result of the comparison by said data comparison means, rows of said spreadsheet to which cells of the same data in said specific column belong to rows to which relevant cells of said merging sheet belong, adding rows in said specific column to which cells existing only in said spreadsheet belong to said merging sheet as new rows; and recording flags to the merged or added rows of said merging sheet, said flags for uniquely identifying the spreadsheet thereof, wherein the relationship between multiple spreadsheets where rows thereof are merged or added to said merging sheet by said sheet merging means can be determined based on a combination of said flags.

Preferably, a plurality of spreadsheets to be merged are pre-stored in said data storage device; and said input device includes a pointing device for allowing the user to designate on said designation screen any one of the plurality of spreadsheets stored and a specific column contained in that spreadsheet. So configured, the spreadsheet and specific column can be designated by merely operating the pointing device.

From the standpoint of quickly ascertaining the relationship of the data after merging, the data management system further comprises: logical criteria determination means for counting the number of rows where said flag combination aspects are the same, and determining the counting result as a result of logical criteria determination between a plurality of spreadsheets where rows thereof are merged or added to said merging sheet. From the standpoint of facilitating management of flag combination aspects, the data management system further comprises: numeric-value converting means for converting said flag combination aspects to numeric values, wherein the numeric values converted by said numeric-value converting means and the determination result by said logic criteria determination means are stored as mapped to each other.

Said screen display means represents the determination result of said logic criteria determination means via an image on said display device. More specifically, said screen display means converts a spreadsheets identified by individual flags to Venn diagrams where the area thereof corresponds to the number of their rows, and represents a determination result of a logical product between a plurality of spreadsheets that contain the respective rows via an overlap of said Venn diagrams. Alternatively, said screen display means represents a logical criteria determination result between said plurality of spreadsheets via a truth-table image. The truth table tabulates input conditions for representing logical functions and their corresponding output values, and the truth-table image represents the truth table in a graphical format.

Venn diagram-based representations are simple and offer an advantage that the data sizes of individual spreadsheets and their relationships may be intuitively understood at a glance; however, they suffer difficulty in simultaneously displaying logical criteria determination results for four or more spreadsheets. Because the truth table does not suffer such limitations, it is more preferable than Venn diagrams when four or more logical criteria determinations are performed.

In said spreadsheet and said merging sheet, the relationship between row data and column data described above may be reversed. That is, row data may be treated as column data, and column data containing a specific column may be treated as row data.

A data management method according to the present invention is such that a computer having interface components that enable connections with a display device, an input device, and a data storage device reads a predetermined computer program to execute the processes of: displaying a designation screen on said display device, said designation screen allowing the user to designate a spreadsheet having a row/column tabular data structure and a specific column contained in that spreadsheet; accepting the spreadsheet and specific column designated by the user through said input device in accordance with said designation screen displayed; generating a merging sheet having a row/column tabular data structure and storing the merging sheet generated into said data storage device; comparing the spreadsheet accepted and the merging sheet stored in said data storage device on a cell-by-cell basis, said cell being an intersection area of the row and column; merging, as a result of the comparison, rows of said spreadsheet to which cells of the same data in said specific column belong to rows to which relevant cells of said merging sheet belong, adding rows in said specific column to which cells existing only in said spreadsheet belong to said merging sheet as new rows, and recording flags to the merged or added rows of said merging sheet, said flags for uniquely identifying the spreadsheet thereof; and determining the relationship between multiple spreadsheets where rows thereof are merged or added to said merging sheet, based on a combination of said flags.

A recording medium according to the present invention is a computer-readable recording medium that stores a computer program for allowing a computer having interface components that enable connections with a display device, an input device, and a data storage device to execute the afore-described processes.

BRIEF DESCRIPTION OF THE DRAWINGS

Referring to the drawings wherein like characters indicate like parts throughout the various figures:

FIG. 8 is a diagram illustrating the contents of Table A to be merged;

FIG. 9 is a diagram illustrating the contents of Table B to be merged;

FIG. 10 is a diagram illustrating the contents of Table C to be merged;

FIG. 11 is a diagram illustrating the merged table that contains the contents of Table A;

FIG. 12 is a diagram illustrating the merged table with the added item from Table B;

FIG. 13 is a diagram illustrating the merged table that contains the contents of Table A, where rows of Table B to which cells of the same data belong are merged;

FIG. 14 is a diagram illustrating the merged table that contains the contents of Table A, where rows of Table B to which cells without the same data belong are newly added;

DETAILED DESCRIPTION OF THE PREFERRED EMBODIMENT

An embodiment of the present invention where it is applied to spreadsheet software is described in detail below.

<System Configuration>

Figure 1:
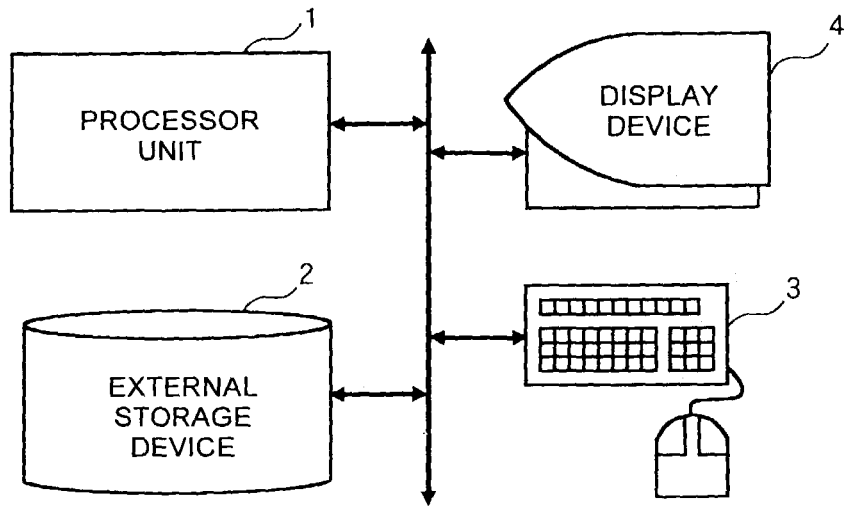
FIG. 1 is an overall schematic diagram of a data management system according to an embodiment of the present invention.

FIG. 1 is a hardware schematic diagram of a data management system according to one embodiment of the present invention. The data management system may be implemented by a personal computer (PC) having interface components for connecting a processor unit 1 containing a memory, such as a RAM, to an external storage device 2, an input device 3, and a display device 4.

The external storage device 2 typically employs a hard disk, but it may also comprise a data source existing outside the system via a network, besides a hard disk. The external storage device 2 contains a plurality of spreadsheets, each having a row/column tabular data structure, and computer programs, and also includes a merging sheet recording area formed therein for recording a merging sheet having a similar row/column tabular data structure. The spreadsheet is such that its name (ID) and a plurality of items, or its column definitions, can be read out and displayed.

It should be appreciated that individual spreadsheets and merging sheets are herein simply referred to as "tables" and "merged table", respectively, for the sake of simplicity.

The aforementioned computer programs are an operating system for enabling the processor unit 1, spreadsheet software, and a table merge program, which operate cooperatively to allow the PC to act as a data management system of the present invention. The spreadsheet software is general-purpose software running on the operating system, so Microsoft's "Excel", for example, may be used.

The table merge program may be implemented as a program that achieves extended functionality, such as Excel's add-in program. That is, the "table merge" program may be such that by embedding the "table merge" item in the operating menus of the spreadsheet software, the user may select the "table merge" function to execute it.

The input device 3 is intended to input operations performed by the user, such as selecting a table or column to be merged, selecting a screen to be displayed on the display device 4, and selecting a data area to be displayed on screen, and is comprised of a pointing device, such as a mouse. The display device 4 is designed to provide to the user a graphical user interface for table merge or data display, and is comprised of a display having browser functionality.

Next, the functions formed by the processor unit 1 that executes the computer programs, especially, the table merge program, are described.

Figure 2:
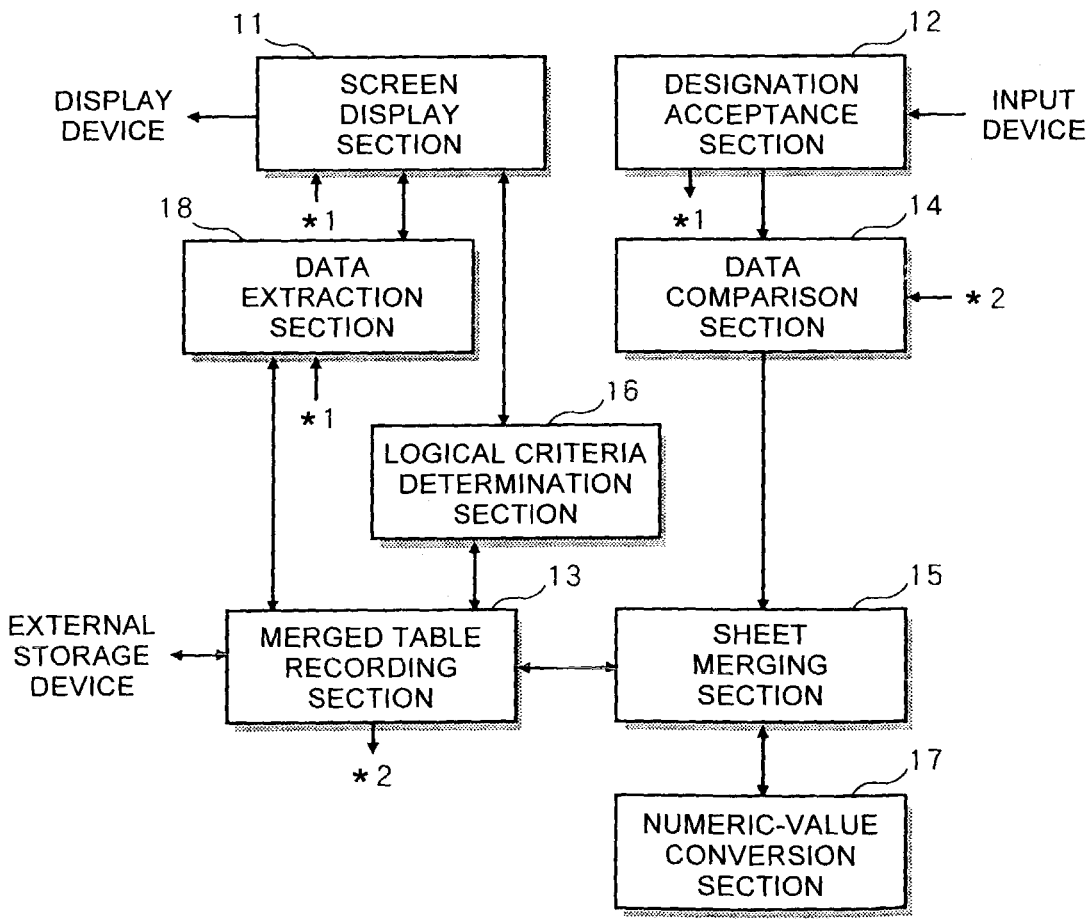
FIG. 2 is a functional block schematic diagram of the data management system.

With the present embodiment, by executing the table merge program, individual functional blocks, i.e., a screen display section 11, a designation acceptance section 12, a merged table recording section 13, a data comparison section 14, a sheet merging section 15, a logical criteria determination section 16, a numeric-value conversion section 17, and data extraction section 18, are formed in the processor unit 1 as shown in FIG. 2.

The screen display section 11 functions to provide a graphical user interface (GUI) screen to the user via the display device 4. With the present embodiment, a designation pane (screen) where the user can designate, among others, a table to be merged and one of the items defined in the columns of that table that serves as a key (hereinafter referred to as a "key item") through mouse-only operation, and a set representation pane (screen) for displaying the table as a set, are displayed on the display device 4. The GUI screen includes a plurality of page views available in a hierarchical manner, so that the page views sequentially toggle from top to bottom. Although depending on the setting, the designation pane and set representation pane may be viewed on the same screen. Key items that are selectable on the designation pane are for matching cells (data areas where rows and column intersect) of the table to be merged.

Figure 3:
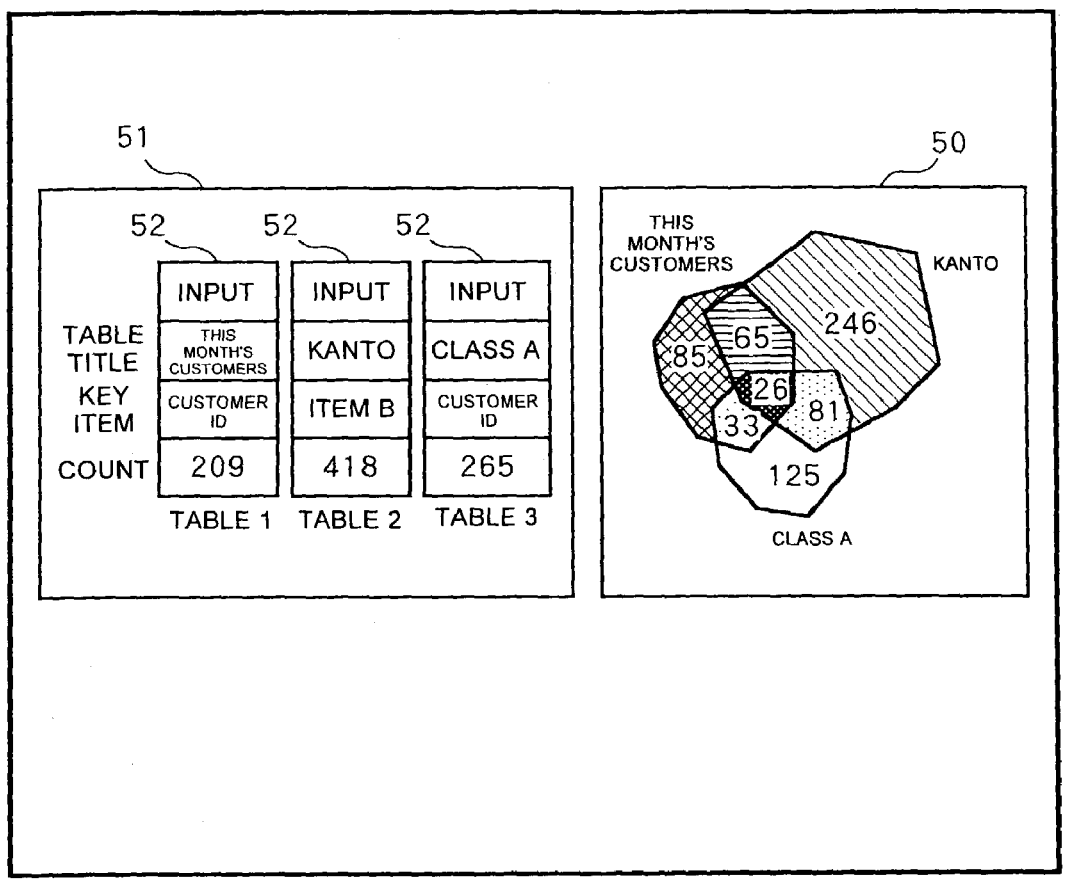
FIG. 3 is a diagram illustrating one example of GUI screen according to the present embodiment.

FIG. 3 shows one example of GUI screen where the designation pane and set representation pane appear in split view on the single screen. The left-side display area of the GUI screen is a top display area 51 of the designation pane. In the top display area 51, input buttons 52 are buttons that allow the user to designate a plurality of tables to be merged, i.e., three tables, Table 1, Table 2, and Table 3 in the example shown, and are disposed for the respective input fields corresponding to the respective tables. When the user selects one of the input fields and presses its input button 52 to finalize the designation of the table, the name of the table (table title), key item, the count of data recorded in the table, as read from the external storage device 2, appear below each of the input buttons 52, as shown.

The right-hand display area of the GUI screen is a set representation pane 50. The set representation pane 50 displays, together with table titles, a result of logical criteria determination performed among the respective sets when Tables 1, 2, and 3 designated by the user are regarded as sets. The result of the logical criteria determination is selectable, according to the setup menu (not shown) displayed on the GUI screen, from a Venn diagram view or a truth-table image view, or a concurrent view of either the diagram or image and tabular-format data.

Figure 4:
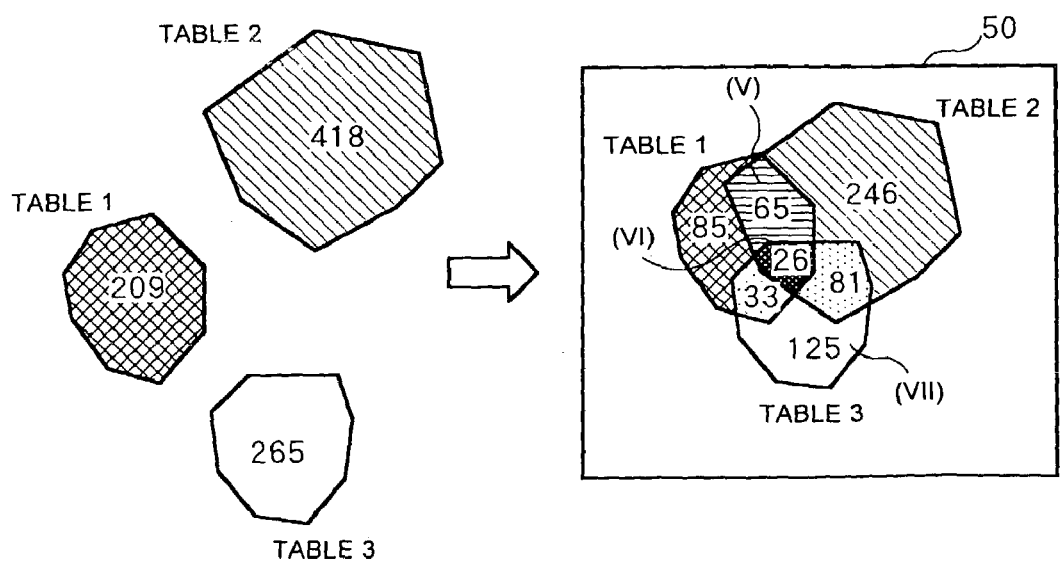
FIG. 4 is a diagram illustrating one example of set representations by Venn diagrams.

In the Venn diagram view, tables identified by individual flags are converted to Venn diagrams whose areas correspond to the number of their rows, as shown on the left-hand side of FIG. 4, while the logical product determination results for a plurality of tables are represented by overlaps of the Venn diagrams, as shown on the right-hand side of FIG. 4. In the truth-table image view, determination results of logical sums and logical products for a plurality of tables are represented by truth-table images as shown in FIG. 5.

Figures 5, 6, 7:
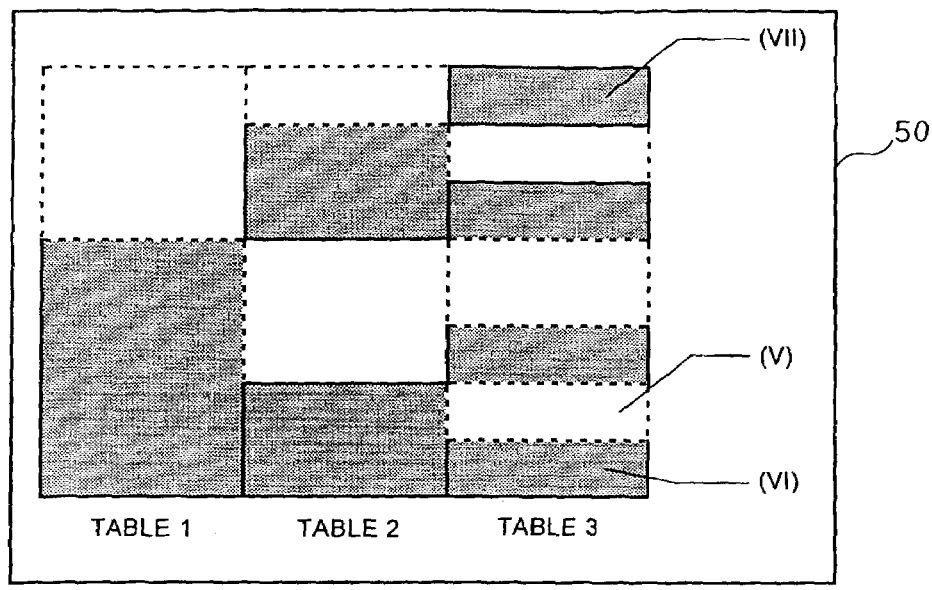
FIG. 5 is a diagram illustrating one example of set representations by truth table images.
FIG. 6 is a diagram illustrating a layout example of merged sheet.
FIG. 7 is a diagram illustrating an example of detail designation screen.

The Venn diagram of FIG. 4 and the truth-table image of FIG. 5 both represent data of the same contents. That is, data in areas denoted by (v), (vi), and (vii) in FIG. 4 are identical to data in areas denoted by (v), (vi), and (vii) in FIG. 5.

It should be appreciated that FIG. 3 shows an example where three tables are merged, although the number of input fields may be greater than three.

The designation acceptance section 12 functions to determine the content designated by the user's mouse operation according to the GUI screen, as shown in FIG. 3. More specifically, it identifies the position of the pointer that moves across the screen in conjunction with the movement of the mouse, and the content of the operation designated via the mouse, and determines the content of the mouse operation according to the content identified. Designation of the Tables 1, 2, and 3, as well as key items, designation of the Venn diagram/truth-table image/tabular data, and other designations are performed according to the content determined by the designation acceptance section 12.

The merged table recording section 13 serves to generate a merged table having a row/column tabular data structure, and store the merged table generated in the merged table recording area of the external storage device 2.

The merged table has a layout shown in FIG. 6, for example, and all of its cells are vacant under initial condition. If the number of tables to be merged is pre-known, flag items according to that number are arranged in the respective rows. In the example of FIG. 6, three flag items (Flag 1 through Flag. 3) are arranged according to the number of tables to be merged. It should be appreciated that the flag items may be arranged a posteriori during table merge.

The data comparison section 14 acts to compare the table designated by the user and the merged table on a cell-by-cell basis, a cell being an intersection area of each row and column. That is, because in spite of the same item, data in the cell classified under that item may differ between the table and merged table, their match is determined.

For cells of the same data under the key item as a result of the comparison by the data comparison section 14, the sheet merge section 15 functions to merge data of rows to which the relevant cells of the table designated belong to rows to which the relevant cells of the merged table belong; as to the key item, for cells that exist only in the table designated, it functions to add data of rows to which the relevant cells belong to the merged table as data of new rows; and it functions to record, in the row merged or added in the merged table, a flag for uniquely identifying that table. As a flag, a character, value, or any information may be chosen, although, in the present embodiment, binary data is used so that the state where the flag is set is denoted by "1", while the state where the flag is not set is denoted by "0".

The logical criteria determination section 16 acts to count the number of rows where combinations of flags, for example, 111, 110, 101, 100, 011, 010, and 001, for three flag items, are identical, according to each combination, and determine the counting result as a logical criteria determination result among a plurality of tables where their rows are merged or added to the merged table.

The numeric-value conversion section 17 serves to convert the afore-described flag combination aspects to numeric values, and record the converted numeric values and count results as mapped to each other. In this case, the numeric values may be in binary or decimal notation. In the case of decimal notation, "111" is "7"; "110" is "6", and so on.

The data extraction section 18 functions to extract, based on the numeric value converted by the numeric-value conversion section 17, the data for the afore-described count result from the merged table.

<Operating Procedures>

Next, the operating procedures of the data management system so configured according to the present embodiment are described.

(1) Start Up

When a need arises to perform a table merge while the spreadsheet software is running, the user chooses "Table Merge" from the operating menus of the spreadsheet software. Then, the table merge program starts, so that the screen display section 11 causes the display device 4 to display the GUI screen shown in FIG. 3.

(2) Designate Table, etc.

In the top view area 51 on the GUI screen of FIG. 3, when the input button 52 of the input field corresponding to "Table 1" is activated by the user, the screen display section 11 causes a detail designation screen for designating a first table to be merged to be displayed in place of the GUI screen. FIG. 7 shows one example of the detail designation screen.

On the detail designation screen, a table to be merged can be chosen in a hierarchical manner via "Book" or a collection of tables, "Sheet" or a unit of tables, and "Selection Range" or a portion of the table. Furthermore, a desired key item, or one of column definitions of the table, may be selected via "Key Item". In the example shown in FIG. 7, all range of the table belonging to "ABC" and identified by "Sheet 1" is designated as a first table to be merged, and the key item (CustKey) contained in that table is designated. As the user clicks on the "OK" button on the detail designation screen, the designation acceptance section 12 determines the contents of those designations.

For the second and third tables, as the input buttons 52 of the input fields for "Table 2" and "Table 3" in the top view area 51 are pressed by the user, their contents are determined according to similar procedures.

The contents of the first table designated in this way are shown in FIG. 8, the contents of the second table designated are shown in FIG. 9, and the contents of the third table designated are shown in FIG. 10. Here, the first table (table whose contents are determined by the input field of Table 1), the second table (whose contents are determined by the input field of Table 2), and the third table (whose contents are determined by the input field of Table 3) are denoted by "Table A", "Table B", and "Table C", respectively, for the sake of convenience. It is assumed that the key item is "Customer Code" for all of them.

(3) Table Merge

Once the tables to be merged are determined, the merged table recording section 13 generates a merged table with a layout shown in FIG. 6, where flag items are set in the column definitions, and stores it in the sheet area of the external storage device 2. The resulting merged table is then sequentially compared by the data comparison section 14 with the data of designated Tables A, B, and C on a cell-by-cell basis, and the row data for each table is sequentially recorded by the sheet merge section 15 into the merged table. Additionally, in the flag item of the merged table corresponding to each table, a flag indicating from which table the row data thereof is inserted is recorded. Furthermore, based on a combination of those flags, an image representing the result of logical criteria determination shown on the set representation pane is generated.

The contents of those processes are described in a more specific manner.

Because all the cells in the merged table are empty under initial condition, cells, excluding the flag items (Flags 1 through 3), are entirely the same as the contents of Table A, as shown in FIG. 11. Each row of "Flag 1", or the flag item corresponding to Table A, contains "1".

After the data of Table A is recorded in the merged table, the resulting merged table is compared with the second table, or Table B. Because "Customer Code", which is common to Table A, is designated as the key item in Table B, no item is added to the merged table, but "Telephone Number" which is an item that is not found in Table A, is added as a new column definition, which is shown in FIG. 12. The cell of Table B where "Customer Code" is "00003" matches the cell of "Customer Code" that is contained in the merged table. Thus, the data of "Telephone Number" for the row to which this cell belongs is recorded into the merged table, and "1" is recorded into "Flag 2", or the flag item corresponding to Table B. The contents of the merged table at this stage is shown in FIG. 13.

Similar processing is performed on the rows to which cells "00004", "00005", and "00008" of "Customer Code" belong. Because cell "00009" is not recorded in the merged table, the data of the row to which that cell belongs is added next to the last row of the merged table, and "1" is recorded into "Flag 2" of the added row. The contents of the merged table at this stage is shown in FIG. 14.

Figures 15, 16, 17:
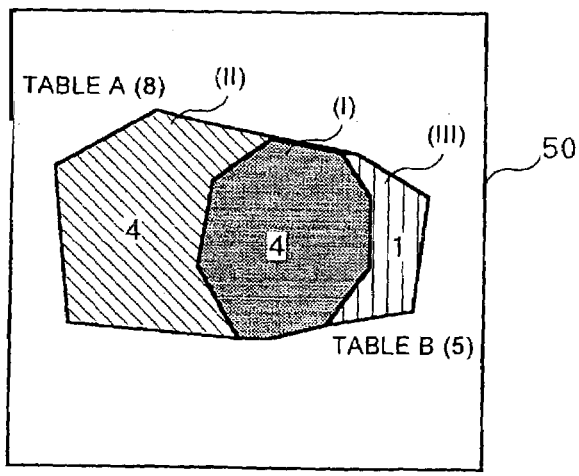
FIG. 15 is a diagram illustrating the merged table where Tables A and B are merged and sorted.
FIG. 16 is a diagram illustrating the result of counting the rows according to each flag combination of the merged table.
FIG. 17 is a diagram illustrating an example of set presentation screen (pane) where the states of Tables A and B re represented by Venn diagrams.

The sheet merge section 15 sorts the merged table, based on the recording status of each flag. Sorting is such that first priority is given to a row where "1" is recorded in all of its flag items, and priority is then given to a row where "1" is recorded in a flag item corresponding to the table that is designated earlier. FIG. 15 shows the result of sorting. As shown in FIG. 15, as a result of sorting, rows contained in both Table A and Table B are arranged in the upper portion of the merged table, and subsequently rows contained in Table A only and then rows contained in Table B only are arranged sequentially. The tallied value of these rows represents the row that provides a relationship of logical sum between Table A and Table B.

After sorting, the logical criteria determination section 16 counts the number of rows where combinations of flags are identical, according to each combination thereof. As described above, the result of counting represents the result of logical criteria determination between tables where their rows are merged or added to the merged table. FIG. 16 shows the result of counting.

Figures 18, 19:
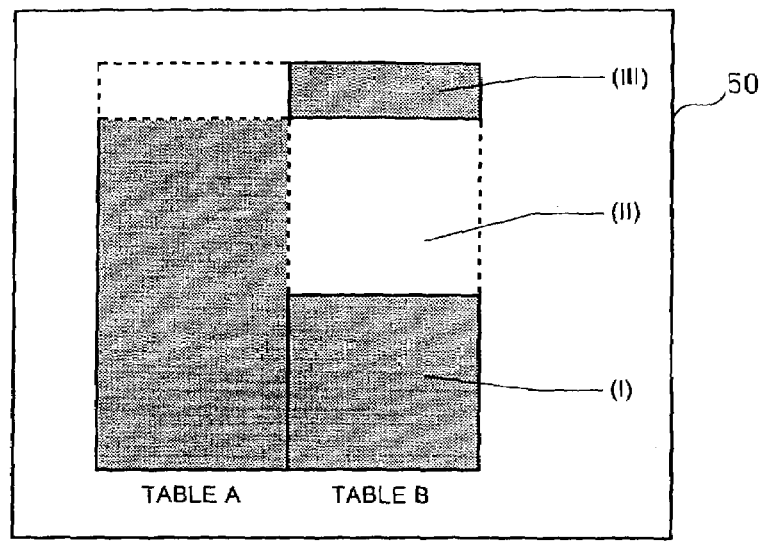
FIG. 18 is a diagram illustrating an example of set representation screen (pane) where the states of Tables A and B are represented by truth table images.
FIG. 19 is a diagram illustrating the merged table where Tables A, B, and C are merged.

The screen display section 11 draws a Venn diagram or a truth-table image on the set representation pane 50, based on the count of rows according to each status of the flag. FIGS. 17 and 18 show a Venn diagram and a truth-table image, respectively, both corresponding to the result of counting the number of rows, shown in FIG. 16.

In other words, in FIGS. 17 and 18, area (i) represents rows contained in both Table A and Table B, and corresponds to the result of counting the rows where "1" is recorded in both "Flag 1" and "Flag 2". Area (ii) corresponds to the result of counting the rows contained in Table A only, that is, rows where "1" is recorded in "Flag 1" only. Area (iii) corresponds to the result of counting the rows contained in Table B only, that is, rows where "1" is recorded in "Flag 2" only.

In this way, as the counting result for each combination of flags (logical criteria determination result) is represented by a Venn diagram or truth-table image, it can be understood at a glance how many rows are available which contain values of key items common to both Table A and Table B.

Similar procedures are also taken to merge new Table C to the merged table where Tables A and B have been merged. That is, an item of Table C that is not found in the merged table (i.e., email-ID) is newly added, and "1" is further recorded into "Flag 3" of rows that contain cells where data is inserted, before sorting is performed. FIG. 19 shows the contents of the resulting merged table. The state of the merged table 19, when represented by a Venn diagram, is as shown in FIG. 20.

(4) Data Representation

When the user selects, through mouse operation, any area of the Venn diagram or truth-table image displayed on the set representation pane 50, the data for that area can be read from the merged table and displayed.

Figures 20, 21:
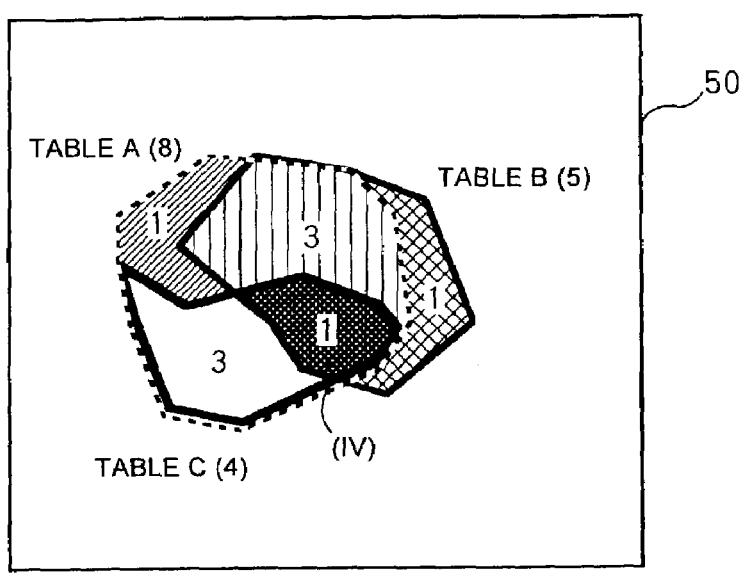
FIG. 20 is a diagram illustrating an example of set representation screen where the contents of the merged table of FIG. 19 are represented by Venn diagrams.
FIG. 21 is a tabular diagram illustrating the result of data extraction for the area selected by the Venn diagram.

In FIG. 20, for example, when the designation acceptance section 12 determines that area (iv), or a commonly overlapped area of Tables A, B, and C, is designated, the data extraction section 18 determines a row of the numerical value corresponding to the flag combination for that area, i.e., a row of flag item "111" in FIG. 19, and extracts the data for that row from the merged table. The screen display section 11 displays the extracted data as its representing image. FIG. 21 is a table illustrating a display example of this case. When another area of FIG. 20 is designated, a representing image corresponding to that area is similarly displayed.

In this way, according to the data management system of the present embodiment, the merged table and the table designated by the user are compared on a cell-by-cell basis, and when a cell of the same data exists for any key item, data for the rows to which the relevant cell in that table belong is merged to rows to which the relevant cell in the merged table belong; for cells existing only in that table, data for the rows to which that cell belongs is added to the merged table as data for a new row. Additionally, a flag for uniquely identifying the table is recorded to the merged or added rows of the merged table, so that the relationship between a plurality of tables where rows thereof are merged or added to the merged table can be determined according to combinations of flags. Furthermore, because a table, a key item, or the like is designated through GUI-based mouse operation, a table merge, which was difficult to perform with conventional spreadsheet software, can be done easily without the need for acquiring knowledge about a database or creating its environment. For its learning, if one understands how to use spreadsheet software to some degree, one may sufficiently operate it, and it is easy to designate criteria for a table merge, so a selection that combines composite criteria can be performed quickly.

It should be appreciated that in the present embodiment, an example has been shown where one of items defined in columns is used as a key item, and merge or addition is done on a row-by-row basis, although definitions for rows and columns may be reversed.

In the present embodiment, an example has been described where the table merge program is executed by an additional function, such as an add-in for the spreadsheet software, although the table merge program may be implemented as standalone software that is independent of the spreadsheet software, so that it can directly handle tabular data.

In the present embodiment, a case where a key item is singular has been described; however, in cases where single items are not univocal, among others, a plurality of items may be combined to provide a key item. For data comparison for each cell of the key item, a pair of data is typically compared to determine a match therebetween; although data comparison for key items may be performed in conjunction with an approach whereby data in cells that is not completely identical but similar is regarded as identical. In so doing, comparisons that ignore full-width or half-width letters of names in Katakana and comparisons that ignore capital-case or small-case letters of names in alphabets, among others, can be performed, thereby enhancing the usability.

As is clear from the above description, the present invention permits spreadsheets to be managed through simple operation.

What is claimed is:

1. A data management system having interface components that enable connections with a display device, an input device, and a data storage device, the data management system comprising:
   screen display section configured for displaying a designation screen on the display device, the designation screen allowing a user to designate a spreadsheet having a row/column tabular data structure and a specific column contained in that spreadsheet;
   designation acceptance section configured for accepting the spreadsheet and the specific column designated by the user through the input device in accordance with the designation screen displayed;
   merged recording section configured for generating a merging sheet having a row/column tabular data structure and storing the merging sheet generated into the data storage device;
   data comparison section configured for comparing cells of the spreadsheet accepted by the designation acceptance section and cells of the merging sheet stored in the data storage device on a cell-by-cell basis, the cells of the spreadsheet and the cells of the merging sheet being intersection areas of the rows and columns; and
   sheet merging section configured for merging rows of cells of the spreadsheet to the corresponding rows of cells of the merging sheet, respectively as determined by the specific column based on the result of the comparison by the data comparison section;
   adding, as new rows to the merging sheet, rows of cells which exist only in the spreadsheet as determined by the specific column; and
   respectively recording flags to the merged or added rows of the merging sheet, in which the flags uniquely identify the respective spreadsheet sources of the merged or added rows;
   wherein the relationship between multiple spreadsheets, the rows of which are merged or added to the merging sheet by the sheet merging section, is determinable based on a combination of the flags, and
   wherein the merging sheet including the flags and the merged data are represented on the display device.

2. A data management system according to claim 1, wherein:
   a plurality of spreadsheets to be merged are pre-stored in the data storage device; and
   the input device includes a pointing device for allowing the user to designate on the designation screen any one of the plurality of spreadsheets stored and a specific column contained in that spreadsheet.

3. A data management system according to claim 1, further comprising:
   logical criteria determination section configured for counting the number of rows where the flag combination aspects are the same, and determining the counting result as a result of logical criteria determination between a plurality of spreadsheets where rows thereof are merged or added to the merging sheet.

4. A data management system according to claim 3, further comprising:
   numeric-value converting section configured for the for converting flag combination aspects to numeric values, wherein the numeric values converted by the numeric-value converting section and the result determined by the logic criteria determination section are stored as mapped to each other.

5. A data management system according to claim 3, wherein:
   the screen display section represents the result determination by the logic criteria determination section via an image on said display device.

6. A data management system according to claim 5, wherein:
   the screen display section converts spreadsheet identified by individual flags to Venn diagrams where the area thereof corresponds to the number of the spreadsheets converted by the screen display section, and represents a determination result of a logical product between a plurality of spreadsheets that contain the respective rows via an overlap of the Venn diagrams.

7. A data management system according to claim 5, wherein:
   the screen display section represents a logical criteria determination result between said plurality of spreadsheets via a truth-table image.

8. A data management system according to claim 1, wherein:
   row data in the spreadsheet and the merging sheet is column data, and column data containing said specific column is row data.

9. A data management system according to claim 1 wherein the recording of the flags to the merged or added rows of the merging sheet includes recording of at least three different flags.

10. A data management method, wherein a computer having interface components that enable connections with a display device, an input device, and a data storage device reads a predetermined computer program to execute the method, the method comprising:
- displaying a designation screen on the display device, the designation screen allowing the user to designate a spreadsheet having a row/column tabular data structure and a specific column contained in that spreadsheet;
- accepting the spreadsheet and specific column designated by the user through the input device in accordance with the designation screen displayed;
- generating a merging sheet having a row/column tabular data structure and storing the merging sheet generated into the data storage device;
- comparing cells of the spreadsheet accepted and cells of the merging sheet stored in the data storage device on a cell-by-cell basis, the cells of the spreadsheet and the cells of the merging sheet being intersection areas of rows and columns;
- merging rows of cells of the spreadsheet to the corresponding rows of cells of the merging sheet, respectively as determined by the specific column based on the result of comparing cells of the spreadsheet;
- adding, as new rows to the merging sheet, rows of cells which exist only in the spreadsheet as determined by the specific column; and
- respectively recording flags to the merged or added rows of the merging sheet, in which the flags uniquely identify the respective spreadsheet sources of the merged or added rows;
- determining the relationship between multiple spreadsheets, the rows of which are merged or added to the merging sheet, is determinable based on a combination of the flags; and
- representing the merging sheet on the display device, including the flags and the merged data.

11. A data management method according to claim 10, wherein:
- a plurality of spreadsheets to be merged are pre-stored in the data storage device; and
- the input device includes a pointing device for allowing the user to designate on the designation screen any one of the plurality of spreadsheets stored and a specific column contained in that spreadsheet.

12. A data management method according to claim 10, further comprising:
- counting, with a logical criteria determination section, the number of rows where the flag combination aspects are the same, and determining the counting result as a result of logical criteria determination between a plurality of spreadsheets where rows thereof are merged or added to the merging sheet.

13. A data management method according to claim 12, further comprising:
- converting, with a numeric-value converting section, the flag combination aspects to numeric values, wherein the numeric values converted by the numeric-value converting section and the result determined by the logic criteria determination section are stored as mapped to each other.

14. A data management method according to claim 12, wherein:
- displaying, with the display device, the result determined by the logic criteria determination section.

15. A data management method according to claim 14, wherein:
- converting, with a screen display section, spreadsheets identified by individual flags to Venn diagrams where the area thereof corresponds to the number of rows of the spreadsheets converted by the screen display section, and represents a determination result of a logical product between a plurality of spreadsheets that contain the respective rows via an overlap of the Venn diagrams.

16. A data management method according to claim 14, wherein:
- displaying, with a screen display section, a logical criteria determination result between a plurality of spreadsheets via a truth-table image.

17. A data management method according to claim 10, wherein:
- row data in the spreadsheet and the merging sheet is column data, and column data containing the specific column is row data.

18. A data management method according to claim 10 wherein the recording of the flags to the merged or added rows of the merging sheet includes recording of at least three different flags.

19. A computer-readable recording medium, wherein a computer program is stored for allowing a computer having interface components that enable connections with a display device, an input device, and a data storage device and the recording medium comprises:
- programming for displaying a designation screen on the display device, the designation screen allowing the user to designate a spreadsheet having a row/column tabular data structure and a specific column contained in that spreadsheet;
- programming for accepting the spreadsheet and specific column designated by the user through the input device in accordance with the designation screen displayed;
- programming for generating a merging sheet having a row/column tabular data structure and storing the merging sheet generated into the data storage device;
- programming for comparing cells of the spreadsheet accepted and cells of the merging sheet stored in the data storage device on a cell-by-cell basis, the cells of the spreadsheet and cell of the merging sheet being intersection areas of rows and columns;
- programming for merging rows of cells of the spreadsheet to the corresponding rows of cells of the merging sheet, respectively as determined by the specific column based on the result of comparing cells of the spreadsheet;
- adding, as new rows to the merging sheet, rows of cells which exist only in the spreadsheet as determined by the specific column; and
- respectively and recording flags to the merged or added rows of the merging sheet, in which the flags uniquely identify the respective spreadsheet sources of the merged or added rows;
- programming for determining the relationship between multiple spreadsheets, the rows of which are merged or added to the merging sheet, is determined based on a combination of the flags; and
- programming for representing on the display device the merging sheet, including the flags and the merged data.

* * * * *

UNITED STATES PATENT AND TRADEMARK OFFICE
CERTIFICATE OF CORRECTION

PATENT NO. : 7,165,214 B2 Page 1 of 1
APPLICATION NO. : 10/382764
DATED : January 16, 2007
INVENTOR(S) : Takashi Ishizaka It is certified that error appears in the above-identified patent and that said Letters Patent is hereby corrected as shown below:

In Col. 12, line 34, Claim 4
please delete "for the"

In Col. 12, line 49, Claim 4
please insert --the-- after "converting'"

In Col. 12, line 49, Claim 6
please insert --of rows-- after "number"

In Col. 12, line 57, Claim 7
please delete "said" and insert --a--

In Col. 14, line 54, Claim 19
please remove "and"

Signed and Sealed this

Fourth Day of December, 2007

JON W. DUDAS
*Director of the United States Patent and Trademark Office*